United States Patent [19]

Ralston

[11] 3,778,807
[45] Dec. 11, 1973

[54] CAPACITIVE INTRUSION DETECTION SYSTEM WITH BALANCED RESONANT CIRCUITS

[75] Inventor: William J. Ralston, Albuquerque, N. Mex.

[73] Assignee: EG & G, Inc., Bedford, Mass.

[22] Filed: Dec. 13, 1972

[21] Appl. No.: 314,904

[52] U.S. Cl. ............................. 340/258 C, 340/276
[51] Int. Cl. ............................................. G08b 13/26
[58] Field of Search ......................... 340/258 C, 276

[56] References Cited
UNITED STATES PATENTS

| | | | |
|---|---|---|---|
| 2,455,376 | 12/1948 | Lindsay | 340/258 C |
| 2,992,420 | 7/1961 | Riker | 340/258 C |
| 3,047,849 | 7/1962 | Hansen | 340/258 C |
| 2,355,395 | 8/1944 | Rubenstein | 340/276 |
| 3,184,730 | 5/1965 | Irish | 340/258 C |

Primary Examiner—John W. Caldwell
Assistant Examiner—Glen R. Swann, III
Attorney—Ralph L. Cadwallader et al.

[57] ABSTRACT

Each of a pair of detector wires is strung along a portion of a boundary to be protected so that both wires are exposed to similar general environmental conditions. The wires are interconnected in respective resonant circuits which are similarly driven at a common frequency so that each resonant circuit provides an a.c. signal having a phase and amplitude which are variable as a function of the capacitance of the respective detector wire. By synchronously demodulating the difference between the two signals, a difference amplitude signal is obtained which is relatively sensitive to differential changes in the capacitances. By employing the rate of change of this demodulating difference signal as an indication of intrusion, a system is obtained which is relatively insensitive to gradual and environmental changes.

10 Claims, 5 Drawing Figures 3,778,807

CAPACITIVE INTRUSION DETECTION SYSTEM WITH BALANCED RESONANT CIRCUITS

BACKGROUND OF THE INVENTION

This invention relates to intrusion detection systems and more particularly to such systems employing capacitive sensing elements.

While capacitive intrusion detector systems have been proposed heretofore, such systems have typically not been suitable for use out-of-doors since changing environmental conditions typically rendered it too difficult to distinguish those signals caused by an intruder from those occurring due to natural causes and from inherent drifting of component values in the system.

Among the several objects of the present invention may be noted the provision of an intrusion detection system which is highly sensitive to intrusions into the protected area; the provision of such a system which is relatively insensitive to overall changes in environmental conditions; the provision of such a system which is relatively insensitive to drifting or gradual changes in local conditions; the provision of such a system which is not subject to interference; the provision of such a system which is highly reliable; and the provision of such a system which is of relatively simple and inexpensive construction. Other objects and features will be in part apparent and in part pointed out hereinafter.

SUMMARY OF THE INVENTION

Briefly, the intrusion detection apparatus of the present invention employs a pair of capacitive detector elements which are exposed to the environment in which intrusion is to be detected, the capacitance with respect to ground of each element being variable as a function of changes in its immediate environmental area. A respective inductance is interconnected with each detector element and forms therewith a resonant circuit, the two circuits being resonant at about the same frequency. Means are provided for applying a preselected drive to each of the resonant circuits at a frequency approximately equal to the common half power point thereby to obtain from each circuit an a.c. signal having an amplitude and phase which are variable as a function of the respective detector element capacitance. These a.c. signals are applied to a differential amplifier which is operative to reject common mode components of those signals and thereby obtain an a.c. difference signal. The a.c. difference signal is then synchronously demodulated under control of the original driving signal to obtain a phase-sensitive amplitude signal. An indication of intrusion detection is then generated when the rate of change of the amplitude sample exceeds a preselected level.

BRIEF DESCRIPTION OF THE DRAWINGS

Corresponding reference characters indicate corresponding parts throughout the several views of the drawings.

DESCRIPTION OF THE PREFERRED EMBODIMENT

As indicated previously, the intrusion detection system of the present invention is of the capacitive detection type, i.e., a system which detects intrusion by means of the change in capacitance induced in a detector element by the presence of the intruding object. For purposes described in greater detail hereinafter, the apparatus of the present invention employs a pair of such detector elements, which are preferably approximately matched in electrical characteristics. In the preferred physical arrangement illustrated in FIG. 2, the detector elements comprise a pair of wires 11 and 13, each of which is supported along a respective portion of a boundary with respect to which intrusion is to be detected. In this case, the boundary is a metallic fence, e.g. a chain link fence 15 which serves as a reference ground for the system. As will be understood by those skilled in the art, each wire will exhibit a capacitance with respect to ground and these capacitance values will be variable as a function of changes in the immediate environment adjacent each wire. In the particular embodiment described with reference to FIG. 1, the wires 11 and 13 may be of appreciable length, i.e., up to 200 feet each, based upon a height above ground of about 2 feet. The capacitance of each wire will thus be about 440 picofarad. The detection circuitry associated with the wires 11 and 13 is preferably mounted closely adjacent the wires themselves so as to minimize stray capacitances, e.g. in a weather-proof box as indicated at 16 in FIG. 2. In order to provide protection for even larger perimeters, multiple units may be employed, strung end to end. In addition to acting as a ground, the fence 15 also effectively shields the detector wires from changing conditions outside the fence which might otherwise effect the wires' capacitances.

Figure 1:
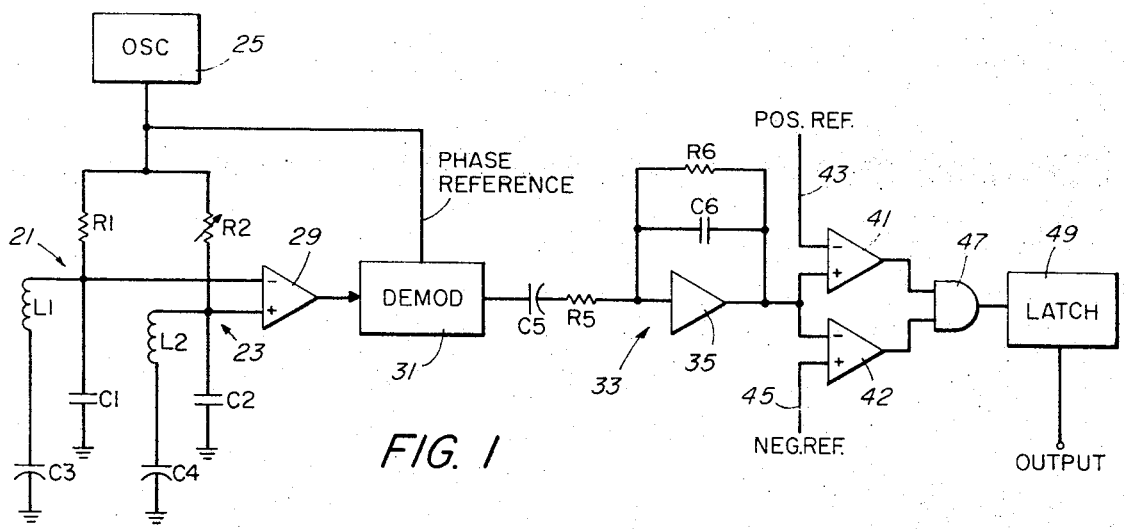
FIG. 1 is a schematic diagram of intrusion detection apparatus in accordance with the present invention.
Figure 2:
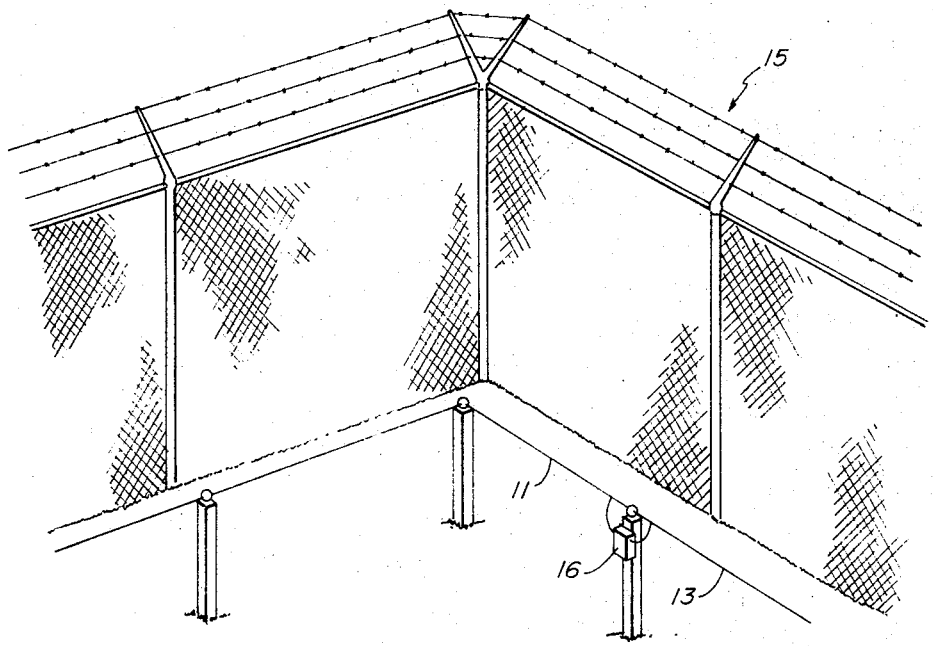
FIG. 2 is an illustration of the preferred method of disposing the capacitive detector elements employed in the apparatus of FIG. 1.

With reference to FIG. 1, the capacitances with respect to ground of the wires 11 and 13 are indicated at C1 and C2. Interconnected with each of the capacitances C1 and C2 is an inductance, L1 and L2 respectively. These may be in the order of one millihenry. One end of each inductor is connected directly to the respective detector wire while the other end of the inductor is connected to ground through a respective electrolytic capacitor C3 or C4. With regard to the a.c. frequencies at which the detector elements are operated, e.g. about 200 kilocycles, the electrolytic capacitors C3 and C4 are essentially short circuits. Thus, the inductors L1 and L2 are effectively in parallel with the capacitances C1 and C2 and form parallel resonant circuits therewith, the capacitors C3 and C4 serving only to provide d.c. isolation. The resonant circuits are designated generally by the reference characters 21 and 23.

Each of the resonant circuits can be driven by means of a signal obtained from an a.c. signal source such as stable oscillator 25. The signal from oscillator 25 is applied to each resonant circuit through a respective decoupling resistor R1 or R2. One of the resistors (R2) is preferably adjustable, as indicated in the drawing, so as to permit initial balancing of the system as described hereinafter. In addition to effectively isolating the two resonant circuits so that they can operate independently, the values of the resistors R1 and R2 also tend to determine the Q of the resonant circuits. When driven in this manner, each of the resonant circuits 21 and 23 operates to provide, at the common junction of the resistor, inductor, and capacitor, an a.c. signal having a phase and amplitude which is variable as a function of the value of the respective sensing capacitance C1 or C2.

The a.c. signals obtained from the resonant circuits 21 and 23 are applied to the inverting and non-inverting inputs respectively of a differential amplifier 29. As is understood by those skilled in the art, the operation of the amplifier 29 is to reject common mode components of the signals provided thereto and to generate an output signal which is an amplified function of the instantaneous difference between the two input signals supplied thereto. This a.c. difference signal is synchronously demodulated by a synchronous detector or demodulator 31 which is operated under the control of the signal source oscillator 25, the output signal from the oscillator being applied to the detector as a phase reference signal. This synchronous demodulation yields a signal which is sensitive to both amplitude and phase differences between the a.c. signals obtained from the two resonant circuits. The demodulated signal is referred to herein as the difference amplitude signal. In general, the demodulator 31 is preferably of the type providing an output signal $$V_o = K_D V_R V_D \cos \theta$$

Where:
  $V_o$ —represents the DC output from the detector.
  $V_R V_D$ —are the reference and input signals, respectively, in volts peak-to-peak.
  $K_D$ —is a gain constant associated with the particular detector.
  $\theta$ —is the phase angle between the reference and input signals in radians.

Such devices are commonly used also as phase detectors when the two input signals are approximately in phase-quadrature. However, as explained hereinafter, the operation of the apparatus of the present invention is based upon the assumption that the input and reference signals will be substantially phase colinear, i.e., at either 0° or 180° relationship.

The difference amplitude signal is applied to a high-pass, active filter 33. Filter 33 employs an amplifier 35 provided with an input network comprising a capacitor C5 and a resistor R5 connected in series and a feedback network comprising a capacitor C6 and a parallel resistor R6. As will again be understood by those skilled in the art, this active filter operates to provide a signal which is responsive to the rate-of-change of the difference amplitude signal. A pair of comparator circuits 41 and 42 sense whether the rate-of-change signal passes outside of a range of values between a preselected positive reference voltage, indicated at 43, and a negative reference voltage, indicated at 45. If the rate-of-change signal passes outside of the range established by these reference voltages, the output of the tripped comparator, operating through an AND gate 47, operates a latch circuit 49. The latch circuit 49 provides an output signal indicating the detection of an intrusion, which signal persists until the latch circuit is reset, even though the rate-of-change signal returns to a value within the deadband range.

Figure 3:
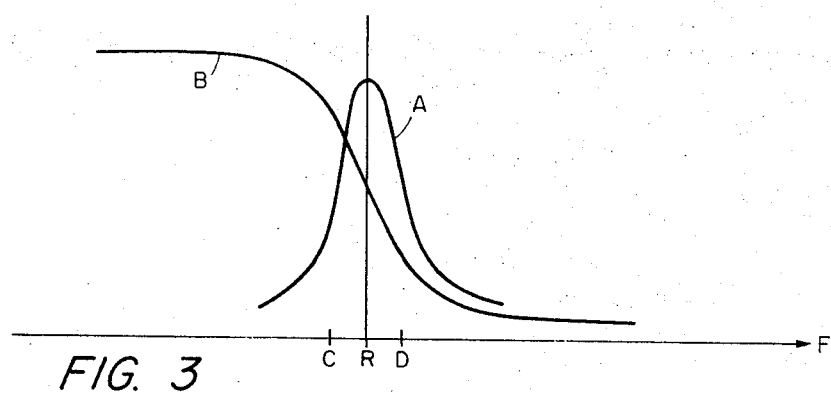
FIG. 3 is a drawing representing the phase and amplitude response of a resonant circuit employed in the apparatus of FIG. 1.
Figure 4:
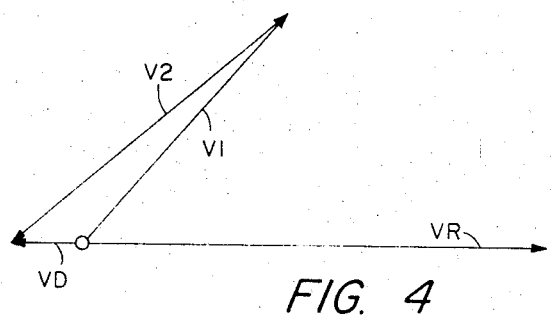
FIG. 4 is a phase diagram useful in illustrating the mode of operation of the apparatus of FIG. 1.

In accordance with one aspect of the present invention, the frequency of the signal provided by the oscillator 25 is selected in relation to the characteristics of the resonant circuits 21 and 23 so that those circuits are operated substantially at one of their half-power points, i.e., a point such that the a.c. signals obtained from the resonant circuits are phase-displaced approximately 45° with respect to the driving signal provided by the oscillator. In FIG. 3, the amplitude and phase responses of one of the resonant circuits are represented at A and B respectively, each being plotted at a function of frequency F. The upper and lower half-power points are indicated at D and C respectively, while the resonance frequency is indicated at R. In FIG. 4, the vector diagram for operation around the lower half-power point is illustrated. The vector VR represents the reference signal from the source 25 while the vector V1 represents the signal obtained from the resonant circuit 21. If the resonant circuit 23 were exactly matched with the resonant circuit 21, subtracting its vector (V2) from the vector V1 would produce an algebraic sum coincidence with the origin and thus the amplitude of the difference signal would be equal to zero. If, however, the capacitance C2 is slightly increased with respect to C1, i.e., by the presence of an intruder, the increase in capacitance will cause both an increase in amplitude and a decrease in phase of the corresponding vector. This is indicated at V2 in FIG. 3. The difference vector VD will thus be essentially colinear with the reference vector VR, a condition which produces the greatest sensitivity in the synchronous detector 31.

While the vector diagram of FIG. 4 facilitates visualization of the operation of the system, it can be shown mathematically that peaks in sensitivity occur at both half power points, with the lower frequency half power point being slightly more sensitive than the higher frequency half power point.

Summarizing, it can be seen that the system is highly sensitive to differential changes in the capacitances exhibited by the two detector wires 11 and 13. Thus, if an intruder should climb over the fence 15, his body capacitance would differentially disturb the balance of the system with a rate-of-change sufficient to exceed the acceptable limits established by the filter 33 and comparators 41 and 42. Accordingly, the latch circuit 49 would be triggered giving an intrusion indication or alarm. On the other hand, general changes in environmental conditions, such as precipitation, tend to affect both detector wires similarly so that no alarm is given, even though the operating points of the resonant circuits 21 and 23 may shift slightly with respect to the nominal half-power point. Since the sensitivity is at a maximum around this point the system sensitivity is not significantly affected. Further, even if general conditions tend to somewhat affect the two detectors differentially, such changes will usually occur relatively gradually and thus the rate-of-change signal generated thereby will not typically exceed the deadband range established by the comparators and, again, no false indication of intrusion will be given.

In one embodiment of the system of FIG. 1, the nominal resonance frequency of the resonant circuits 21 and 23 was about $1.52 \times 10^6$ radians per second and the system was operated at the lower half-power point, about $1.36 \times 10^6$ radians per second. While the a.c. sensing voltage applied to the connector wires was less than three volts a.c. and thus presented no shock hazard, the system was operative to sense an average size man at a distance of about eight feet from the detector wire, without being prone to give false alarms.

Figure 5:
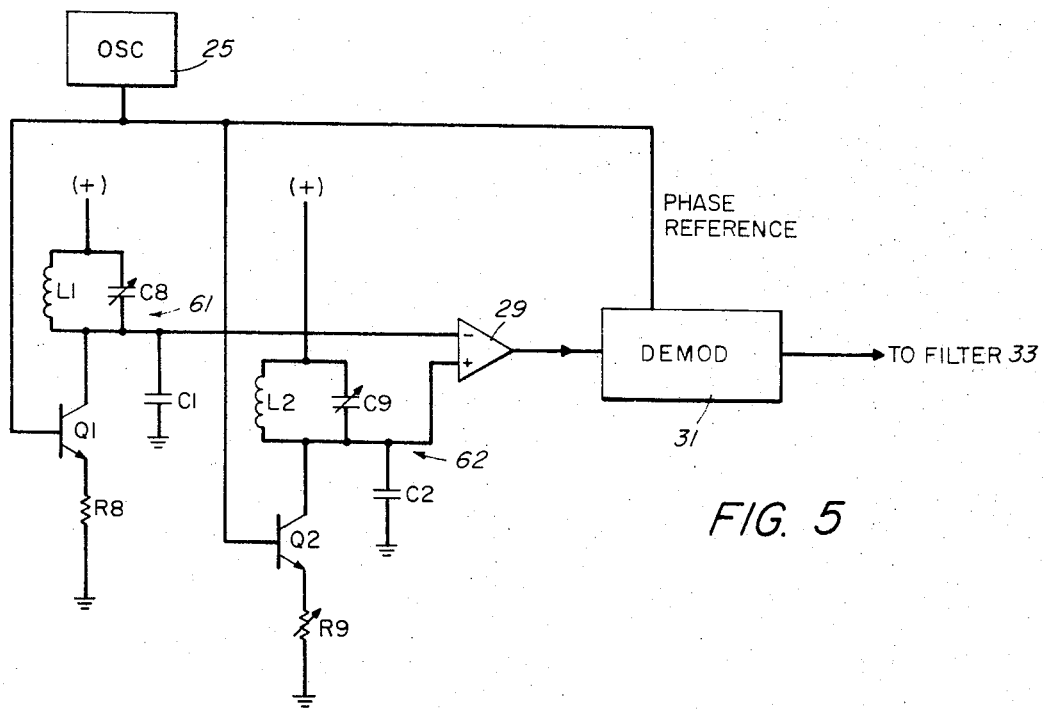
FIG. 5 is a schematic diagram illustration of an alternate embodiment of the invention.

In the aternative embodiment illustrated in FIG. 5, the sensing capacitances C1 and C2 are interconnected in respective resonant circuits 61 and 62 and are driven by the oscillator 25 through respective isolating transistors Q1 and Q2. Although the respective inductances L1 and L2 are connected between the transistor collectors and a positive voltage source, while the capacitances C1 and C2 are connected between the respective collectors and ground, it will be understood that these circuit elements are effectively in parallel for a.c. signals at the frequency of the oscillator 25 and thus parallel resonance circuits are formed. Each inductance is shunted by a respective trimming capacitor C8 and C9 which allows the resonance circuit to be trimmed so that it operates at a half-power point when driven by the oscillator. The emitter circuit of each transistor includes a gain controlling resistor, R8 and R9 respectively, the resistor R9 being adjustable to permit the levels of the a.c. signals provided by the resonant circuits 61 and 62 to be brought into initial balance.

As in the previous embodiment, these signals are applied to differential amplifier 29 to obtain an a.c. difference signal which is synchronously demodulated under the control of a phase reference signal obtained directly from the oscillator 25. In this embodiment, the collector circuits driving the resonant circuits present a relatively high impedance so that a higher Q can be obtained than with the resistively driven and isolated circuits of the embodiment of FIG. 1. As a result of the high Q thereby obtained, the system has a narrower response bandwidth and is less sensitive to interfering signals in the general frequency range of the oscillator 25. Again, however, it is preferable that the resonant frequency of the resonant circuits be selected in relation to their Q and the operating frequency of the oscillator 25 so that the resonant circuits operate nominally around a half-power point.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Intrusion detection apparatus comprising:
a pair of capacitive detector elements exposed to the environment in which intrusion is to be detected, the capacitance with respect to ground of each element being variable as a function of changes in the respective environmental area;
interconnected with each detector element, a respective inductance forming therewith a resonant circuit;
means for applying a preselected a.c. drive to each of said resonant circuits thereby to obtain from each circuit an a.c. signal having an amplitude and phase which are variable as a function of the respective detector element capacitance, both of said resonant circuits being driven at the same frequency;
a differential amplifier operative to reject common mode components of signals applied thereto;
means for applying said a.c. signals to said amplifier thereby to obtain an a.c. difference signal;
detector means operating synchronously with said drive means for demodulating said a.c. difference signal to obtain a phase-sensitive amplitude signal, said amplitude signal being sensitive to intrusions into the environment of said detector elements.

2. Apparatus as set forth in claim 1 in which said detector elements are wires of substantially equal length supported adjacent respective portions of a boundary relative to which intrusion is to be detected.

3. Apparatus as set forth in claim 2 in which said wires are strung in spaced relation to a grounded metallic fence.

4. Apparatus as set forth in claim 3 in which said inductances said differential amplifier and said detector means are mounted in close proximity to said wires thereby to minimize stray capacitances.

5. Apparatus as set forth in claim 1 in which said drive means provides a phase reference signal to said detector means and in which said detector means is of the type providing an output signal $Vo = K_D V_R V_D \cos \theta$ where:
$Vo$ = the d.c. output of the detector;
$K_D$ = a gain constant associated with the said detector;
$V_R$ = the amplitude of said phase reference signal;
$V_D$ = the amplitude of said a.c. difference signal; and
$\theta$ = the phase angle between the phase reference signal and the a.c. difference signal.

6. Intrusion detection apparatus comprising:
a pair of capacitive detector elements exposed to the environment in which intrusion is to be detected, the capacitance with respect to ground of each element being variable as a function of changes in the respective environmental area;
interconnected with each detector element, a respective inductance forming therewith a parallel resonant circuit resonant essentially at a preselected frequency;
means for driving each of said resonant circuits at a frequency approximately equal to a half-power point of said circuits, thereby to obtain from each circuit an a.c. signal having an amplitude and phase which are variable as a function of the respective detector element capacitance;
a differential amplifier operative to reject common mode components of signals applied thereto;
means for applying said a.c. signals to said amplifier thereby to obtain an a.c. difference signal;
detector means interconnected with said drive means and operated synchronously therewith for synchronously demodulating said a.c. difference signal to obtain a phase-sensitive amplitude signal; and
means providing an indication of intrusion detection when the rate-of-change of said difference amplitude signal exceeds a preselected level.

7. Apparatus as set forth in claim 6 in which said drive means provides a phase reference signal to said detector means and in which said detector means is of the type providing an output signal $Vo = K_D V_R V_D \cos \theta$ where:
$Vo$ = the d.c. output of the detector;

$K_D$ = a gain constant associated with the said detector;

$V_R$ = the amplitude of said phase reference signal;

$V_D$ = the amplitude of said a.c. difference signal; and $\theta$ = the phase angle between the phase reference signal and the a.c. difference signal.

8. Intrusion detection apparatus comprising:

first and second detector wires, each supported along a respective portion of a boundary relative to which intrusion is to be detected, the capacitance with respect to ground of each wire being variable as a function of changes in the respective environmental area;

a respective inductance connected in parallel with the capacitance exhibited by each wire thereby to form a circuit resonant at a preselected frequency which is common to both circuits;

resistance means for feeding each parallel circuit, each resultant circuit having a Q which is substantially equal to a preselected value;

a constant-amplitude signal source driving both of said resonant circuits through the respective resistance means at a frequency approximately equal to the lower half-power points of said resonant circuits to obtain from each an a.c. signal having an amplitude and phase which are variable as a function of the respective detector wire capacitances;

a differential amplifier operative to reject common mode components of signals applied thereto;

means for applying said a.c. signals to said amplifier thereby to obtain an a.c. difference signal;

detector means controlled by said signal source means for synchronously demodulating said a.c. difference signal to obtain a phase-sensitive amplitude signal;

means for obtaining from said amplitude signal a rate-of-change signal; and means providing an indication of intrusion detection when the rate-of-change signal passes out of a preselected range of values.

9. Intrusion detection apparatus comprising:

first and second detector wires, each supported along a respective portion of a boundary relative to which intrusion is to be detected, the capacitance with respect to ground of each wire being variable as a function of changes in the respective environmental area;

a respective inductance connected in parallel with the capacitance exhibited by each wire thereby to form a circuit resonant at a preselected frequency which is common to both circuits;

a transistor for feeding each parallel circuit, the parallel resonant circuit being connected to the collector of the respective transistor;

a constant-amplitude signal source driving both of said resonant circuits through the respective transistors at a frequency approximately equal to the lower half-power points of said resonant circuits to obtain from each an a.c. signal having an amplitude and phase which are variable as a function of the respective detector wire capacitances;

a differential amplifier operative to reject common mode components of signals applied thereto;

means for applying said a.c. signals to said amplifier thereby to obtain an a.c. difference signal;

detector means controlled by said signal source means for synchronously demodulating said a.c. difference signal to obtain a phase-sensitive amplitude signal;

means for obtaining from said amplitude signal a rate-of-change signal; and means providing an indication of intrusion detection when the rate-of-change signal passes out of a preselected range of values.

10. Intrusion detection apparatus comprising:

a metallic fence;

first and second detector wires, each supported adjacent a respective portion of said fence, the capacitance with respect to said fence of each wire being variable as a function of changes in the environment adjacent that wire;

a respective inductance connected in parallel with the capacitance exhibited by each wire thereby to form therewith a circuit which is resonant essentially at a preselected frequency, said preselected frequency being common to both circuits;

a constant-amplitude signal source driving both of said resonant circuits, through respective isolating means, at a frequency approximately equal to the lower half-power points of said resonant circuits thereby to obtain from each resonant circuit an a.c. signal having an amplitude and phase which are variable as a function of the respective detector wire capacitances;

a differential amplifier operative to reject common mode components of signals applied thereto;

means for applying said a.c. signals to said amplifier thereby to obtain an a.c. difference signal;

detector means controlled by said signal source means for synchronously demodulating said a.c. difference signal to obtain a phase-sensitive amplitude signal;

filter means for obtaining from said amplitude signal a rate-of-change signal; and means providing an indication of intrusion detection when the rate-of-change signal passes out of a preselected range of values.

* * * * *